United States Patent
Kawaura

[19]

[11] Patent Number: 6,068,038
[45] Date of Patent: May 30, 2000

[54] DEFLASHING APPARATUS FOR FRICTION WELDING MACHINE

[75] Inventor: Koichi Kawaura, Kariya, Japan

[73] Assignee: Kabushiki Kaisha Toyoda Jidoshokki Seisakusho

[21] Appl. No.: 09/179,796

[22] Filed: Oct. 27, 1998

[30] Foreign Application Priority Data

Nov. 19, 1997 [JP] Japan ..................................... 9-318668

[51] Int. Cl.$^7$ .................................................. B29C 65/06
[52] U.S. Cl. .......................... 156/580; 156/73.5; 156/267; 156/510
[58] Field of Search ..................................... 156/73.5, 267, 156/580, 580.1, 580.2, 510; 264/68; 228/112.1, 114, 114.5, 2.1, 2.3

[56] References Cited

U.S. PATENT DOCUMENTS

| | | | |
|---|---|---|---|
| 3,853,258 | 12/1974 | Louw et al. | 228/2.1 |
| 4,832,769 | 5/1989 | Shantz et al. | 156/73.5 |
| 4,944,977 | 7/1990 | Shantz et al. | 428/36.92 |
| 5,492,581 | 2/1996 | Searle | 156/73.5 |

FOREIGN PATENT DOCUMENTS

| | | |
|---|---|---|
| 50-24695 | 8/1975 | Japan . |
| 61-99592 | 5/1986 | Japan . |
| 3-54034 | 8/1991 | Japan . |
| 4-118188 | 4/1992 | Japan . |
| 6-238469 | 8/1994 | Japan . |
| 8-199327 | 8/1996 | Japan . |

*Primary Examiner*—James Sells
*Attorney, Agent, or Firm*—Morgan & Finnegan, L.L.P.

[57] ABSTRACT

A deflashing apparatus is incorporated into a friction welding machine which includes a rotary chuck for chucking a first workpiece, and a carriage having a fixed chuck for chucking a second workpiece and being capable of advancing and retracting in an axial direction. The deflashing apparatus includes a pair of cutter arms, an assistant member, and a bumper fitting. The cutter arms are disposed on the carriage, can swivel, and include a press-cutter joined at the leading end. The press-cutter is dividable into two members, and can envelop the first workpiece. The assistant member is disposed on the carriage, and holds a stopper. The stopper contacts with an end of the second workpiece. The bumper fitting is brought into contact with the assistant member to inhibit the assistant member from retracting. After the first and second workpieces are joined, the rotary chuck releases the first workpiece, and the carriage retracts. In the meantime, the cuter arms swivel to envelop the first workpiece with the press-cutter. When the fixed chuck releases the second workpiece and the assistant member and bumper fitting are brought into contact with each other, the assistant member is stopped ahead of a retract end of the carriage by a stroke of press-cutting. Thereafter, the carriage is retracted by the stroke relatively with respect to the assistant member to deflash the joint between the first and second workpieces with the press-cutter. Thus, the deflashing operation can be completed automatically within the cycle time of the friction welding operation.

6 Claims, 5 Drawing Sheets

DEFLASHING APPARATUS FOR FRICTION WELDING MACHINE

BACKGROUND OF THE INVENTION

1. Field of the Invention

The present invention relates to a deflashing apparatus for a friction welding apparatus. More particularly, it relates to a press-cutting type deflashing apparatus for removing ring-shaped flashes which arise at the joint between rod-shaped workpieces.

2. Description of the Related Art

The following ways have been known for removing the flashes caused by friction welding. For example, as disclosed in Japanese Examined Patent Publication (KOKOKU) No. 50-24,695, a cutting tool (or bit) for deflashing is installed to a friction welding machine. Then, the flashes are machined out rotationally with the cutting tool while rotating a friction welded workpiece. Alternatively, as disclosed in Japanese Unexamined Patent Publication (KOKAI) No. 61-99,592 and Japanese Unexamined Patent Publication (KOKAI) No. 4-118,188, the flashes are sheared out with a dividable cutter (or dies).

However, in the former deflashing way of the aforementioned conventional deflashing ways, the joined workpieces should be rotated again after they are joined, and thereby the flashes are removed by machining. In the meantime, the joined workpieces should be kept being held with a chuck of the friction welding machine. Specifically, the cycle time of the total joining operation is determined by adding the time required for the deflashing operation to the time required for the friction welding operation. The disadvantage has been pointed out as one of the causes for the deteriorating efficiency.

On the other hand, in the latter deflashing way, the friction welding machines disclosed in the latter two publications do not share the deflashing operation, but should be provided with independent deflashing apparatuses, which are designed exclusively for them, respectively. In addition, the friction welding machines are expensive because their constructions should be complicated inevitably.

SUMMARY OF THE INVENTION

It is therefore an object of the present invention to provide a deflashing apparatus that can hardly be disposed independently of a friction welding machine, and that can automatically complete the deflashing operation as well within the cycle time of the friction welding operation.

In an aspect of a deflashing apparatus according to the present invention, the present deflashing apparatus is for a friction welding machine which includes:

a base;

a head stock disposed on the base, having a rotary chuck for holding a first workpiece, and a main shaft assembled therein, the main shaft being capable of quickly stopping; and a carriage disposed on the base, having a fixed chuck for holding a second workpiece so as to be concentric with an axis of the fist workpiece, and being capable of advancing and retracting in the direction of the axis by thrust force applying means; and the present deflashing apparatus comprises:

a pair of cutter arms disposed on the carriage of the friction welding machine, having a leading end, being capable of swiveling, and including a press-cutter, the press-cutter joined at the leading end, being dividable into two members and being capable of enveloping the first workpiece;

an assistant member disposed on the carriage of the friction welding machine, and holding a stopper, the stopper contacting with an end of the second workpiece; and a bumper fitting disposed on the base of the friction welding machine, and being brought into contact with the assistant member to inhibit the assistant member from retracting;

whereby the assistant member is stopped ahead of a retract end of the carriage by a stroke of press-cutting when the fixed chuck is deactivated to release the second workpiece from the chucking and the assistant member and bumper fitting are brought into contact with each other, and thereafter the carriage with the pair of cutter arms disposed thereon is retracted relatively with respect to the assistant member by the stroke of press-cutting to deflash the joint between the first and second workpieces with the press-cutter.

Specifically, after completing the friction welding between the first and second workpieces, the present deflashing apparatus utilizes the retracting process of the carriage, which holds the fixed-side second workpiece, effectively. While the carriage holding the joined workpiece is retracted, the cutter arms are swiveled to close. Accordingly, the press-cutter, which is dividable into two members, envelops the first (or forward) workpiece. Note that, at this moment, the first workpiece has been joined to the second (or rearward) workpiece already. At the same time, the fixed chuck is deactivated to loose the chucking. Consequently, the second workpiece is released from the chucking which has been effected by the fixed chuck. Under the circumstance, the retracting carriage approaches a stopping position (or a retract end). The assistant member holding the stopper is brought into contact with the bumper fitting, and is inhibited from retracting. Accordingly, the joined workpiece is stopped along with the retraction-inhibiting operation. In other words, at this moment, there arises the relative movement between the continuously retracting carriage (especially the press-cutter) and the joined workpiece. As a result, the stationary flashes at the joint are removed by shearing with the retracting press-cutter, and the carriage arrives at the stopping position substantially synchronously with the deflashing operation.

As having described so far, in accordance with the aspect of the present deflashing apparatus, it is unnecessary to dispose a deflashing apparatus independently of the friction welding machine. Moreover, it is possible to complete the deflashing operation within the cycle time of the friction welding operation by simply incorporating the simple mechanism into the friction welding machine. The advantages are produced because the deflashing apparatus operates in the above-described manner. To summarize, after the friction welding operation is completed, the carriage holding the joined workpiece retracts. In the end the retracting process, the swivelable cutter arms are closed, and the two dividable members of the press-cutter envelop the joined workpiece. Whilst, the joined workpiece is released from the chucking which has been effected by the fixed chuck. Accordingly, the assistant member holding the stopper can move relatively with respect to the carriage, and stops ahead of the retract end of the carriage by a stroke of press-cutting. Thus, the flashes at the joint of the joined workpiece are put into a stationary state together with the assistant member. Thereafter, the carriage with the pair of cutter arms disposed thereon is retracted relatively with respect to the assistant member by the stroke. As a result, the stationary flashes can be securely removed by shearing which is effected by a further retraction of the press-cutter of the pair of cutter arms disposed on the carriage.

In a further aspect of the present deflashing apparatus, the carriage can include a main member provided with the fixed chuck and cutter arms, and an auxiliary member connected with the main member but spaced away therefrom in the axial direction; and the assistant member can be disposed between the main member and auxiliary member, can be held movably in the axial direction, and can always contact with the auxiliary member by urging means. With this arrangement, the assistant member can be disposed between the main member and auxiliary member which constitute the carriage, and can always contact with the auxiliary member by urging means, for instance, by an urging force of a spring. Accordingly, the stopper held by the assistant member can be positioned securely stably so that the stopper can keep contacting with the trailing end of the second workpiece.

In a further aspect of the present deflashing apparatus, the assistant member can further have a leg, the leg having a leading end and extending through the auxiliary member; and a retract end of the assistant member can be regulated by bringing the leading end of the leg into contact with the bumper fitting. With this arrangement, the leg of the assistant member can extend through the auxiliary member so that the leading end of the leg is brought into contact with the bumper fitting, which is disposed on the base, for example, on a frame of the thrust force applying means. Consequently, the simple arrangement enables the joined workpiece to stop ahead of the retract end of the carriage by the stroke of press-fitting.

In a further aspect of the present deflashing apparatus, the pair of cutter arms can be actuated by a synchronizing servomotor. With this arrangement, the cutter arms can be swiveled extremely accurately.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

Preferred Embodiment

A deflashing apparatus of a Preferred Embodiment according to the present invention will be hereinafter described with reference to the accompanying drawings.

Figure 1:
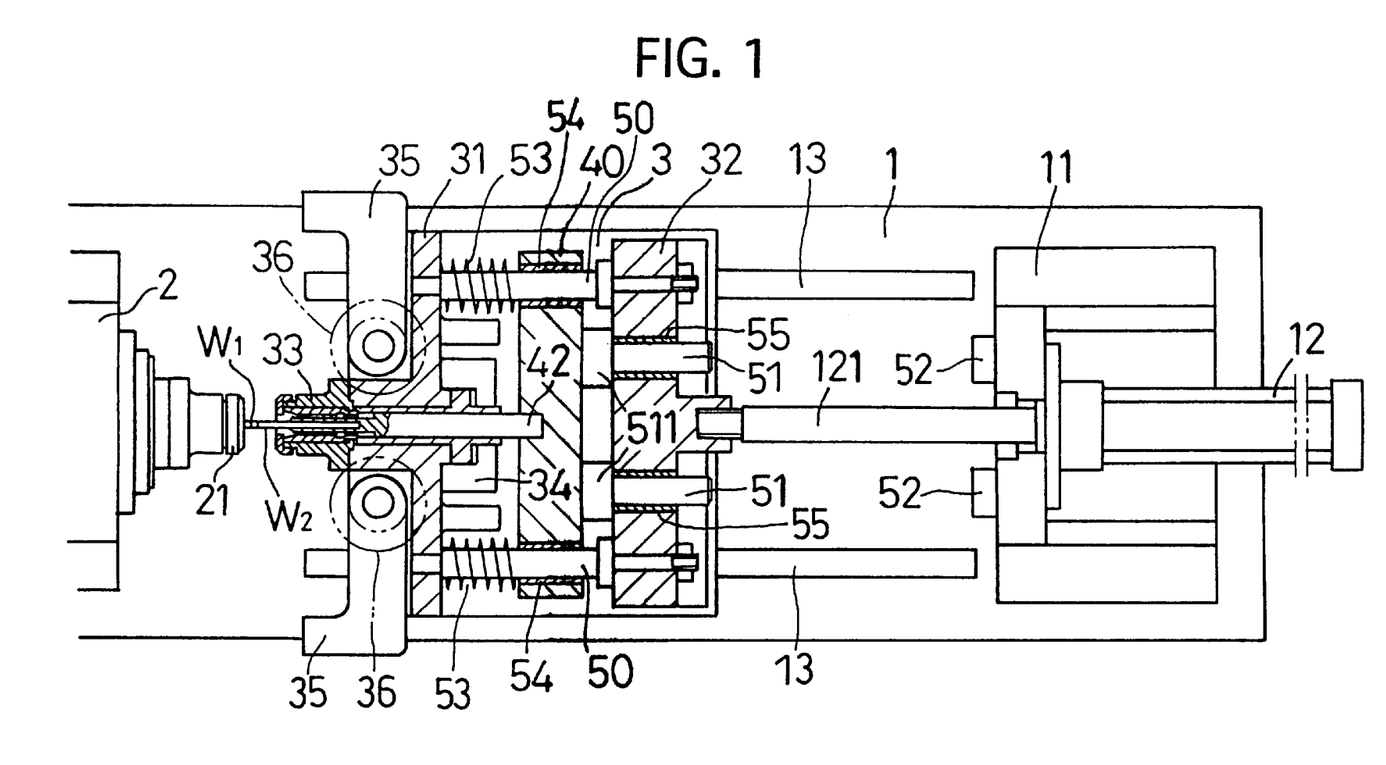
FIG. 1 is a schematic plan view of a friction welding machine into which a deflashing apparatus of a Preferred Embodiment according to the present invention is incorporated, and illustrates how the friction welding machine is arranged to contact a first workpiece with a second workpiece.
Figure 2:
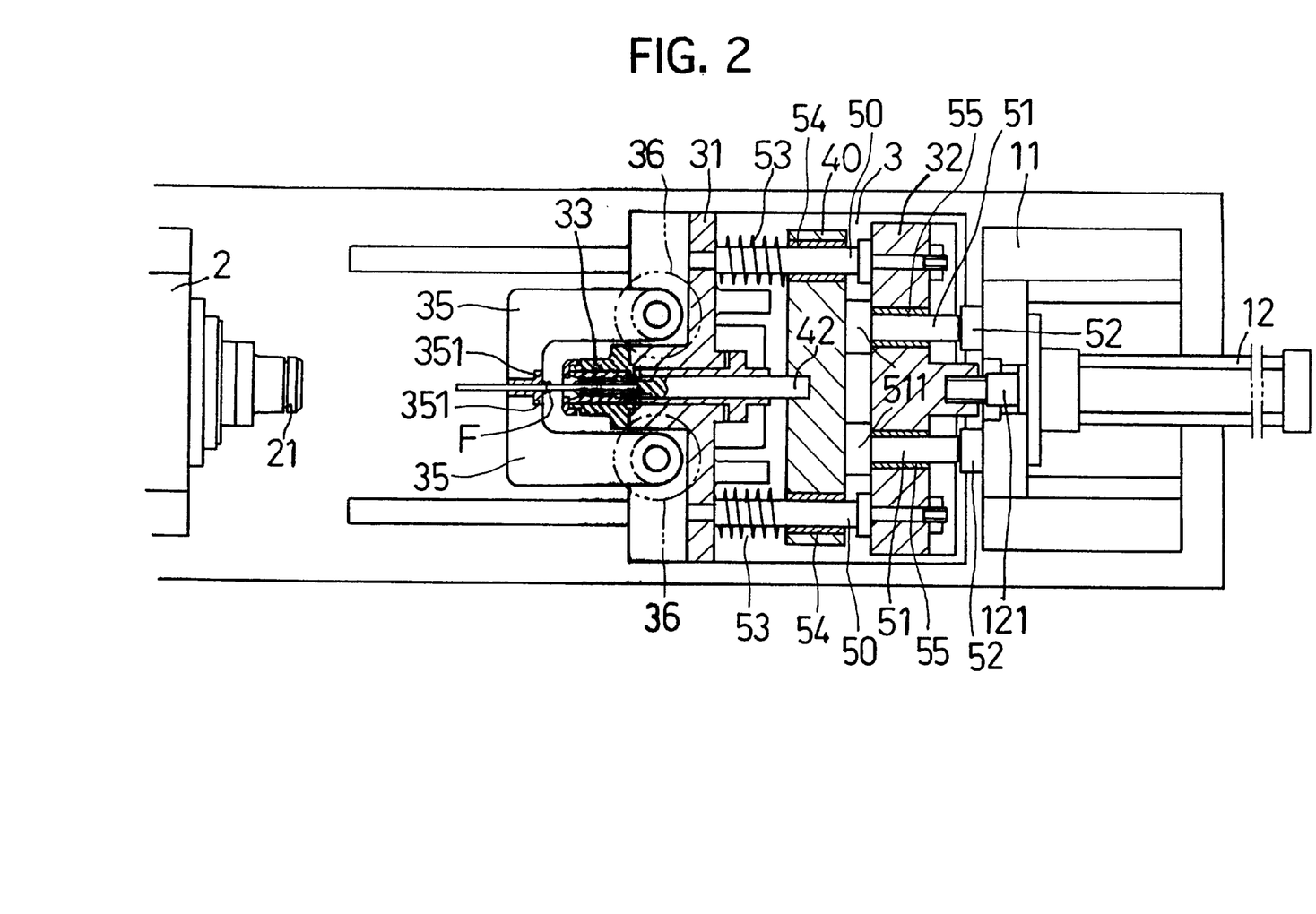
FIG. 2 is a schematic plan view of the friction welding machine, and illustrates how the friction welding machine is arranged immediately before a deflashing operation.
Figure 3:
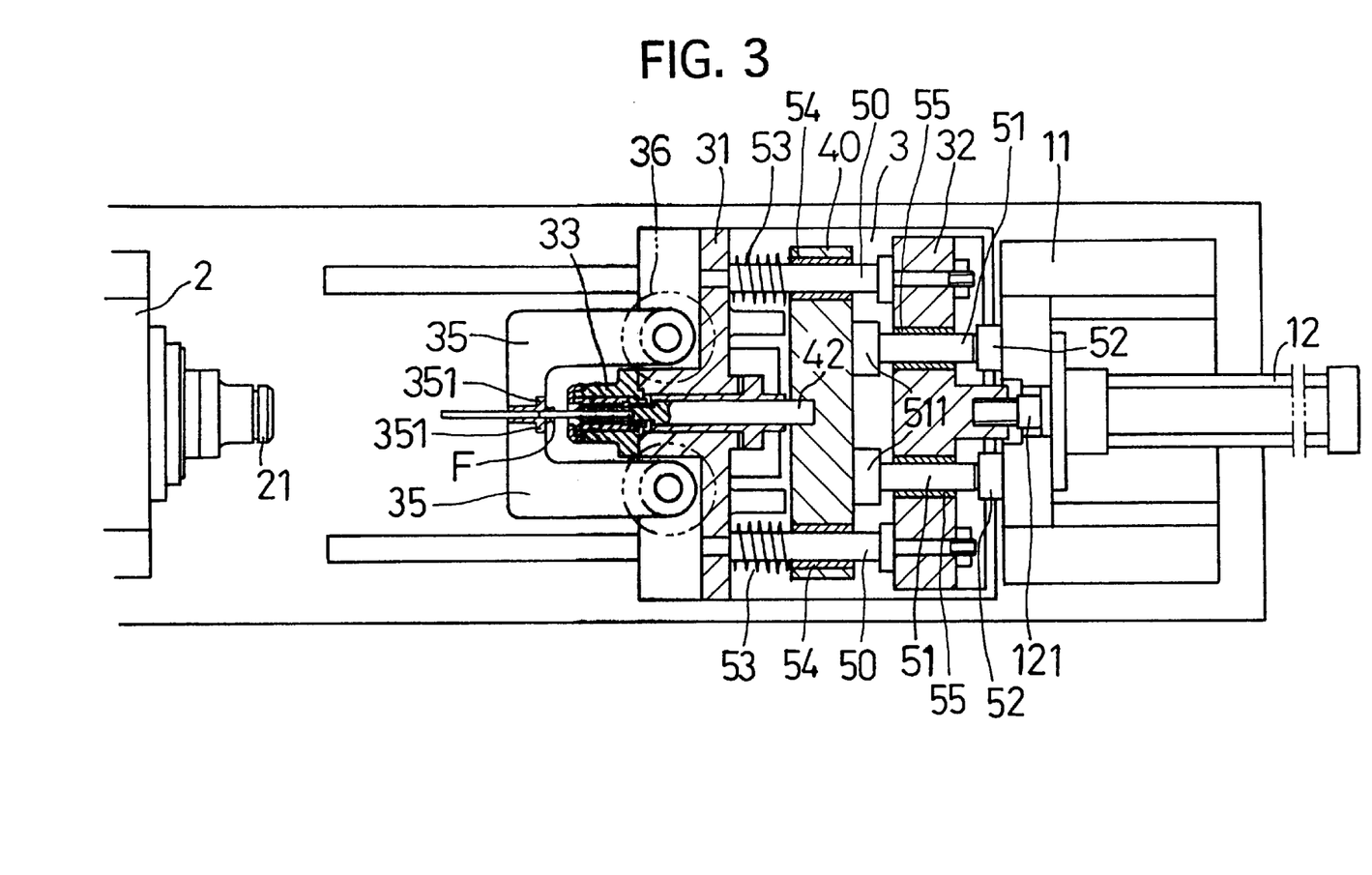
FIG. 3 is a schematic plan view of the friction welding machine, and illustrates how the friction welding machine is arranged after the deflashing operation.
Figure 4:
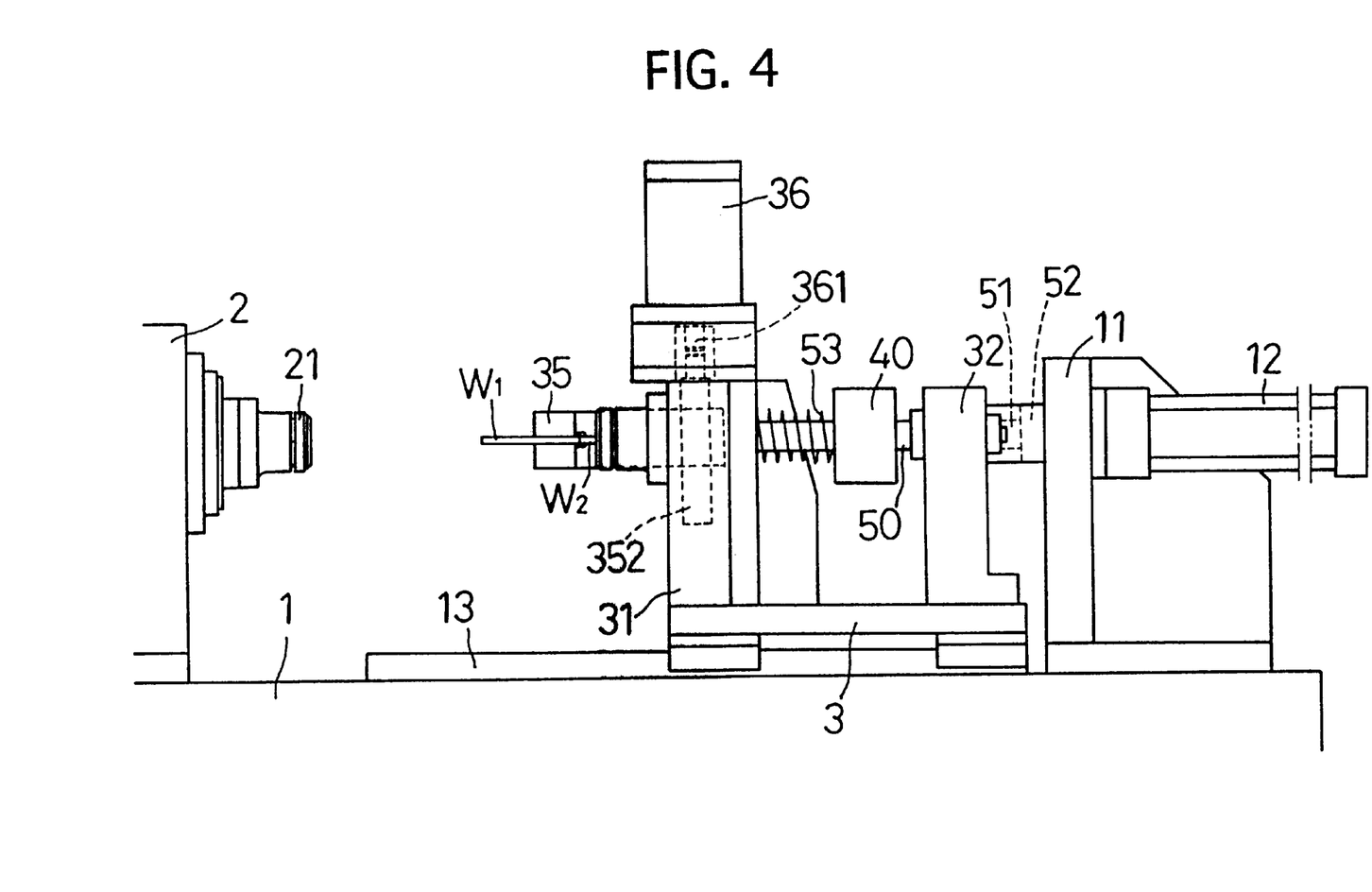
FIG. 4 is a schematic front view of the friction welding machine, and illustrates how the friction welding machine is arranged immediately before a deflashing operation.
Figure 5:
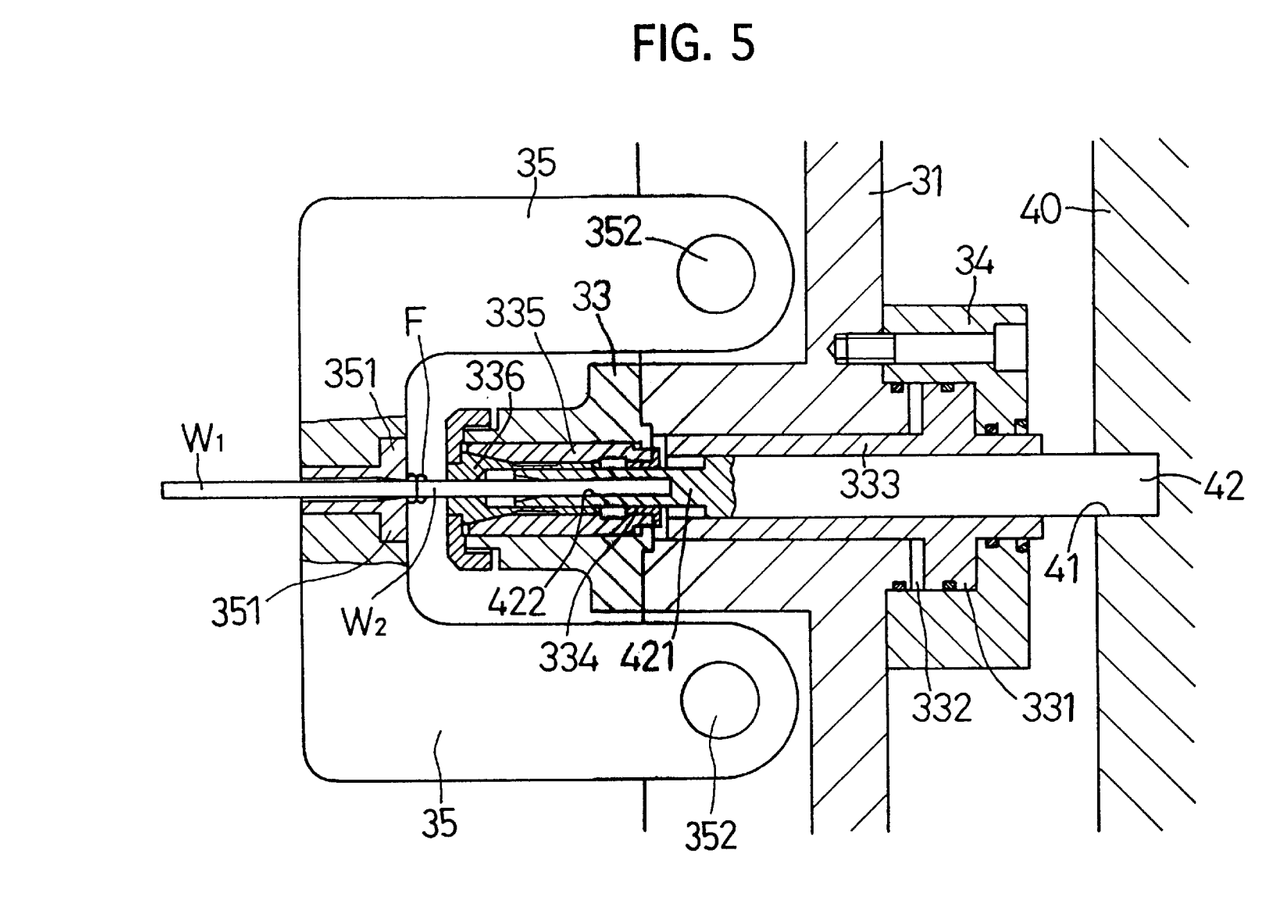
FIG. 5 is an enlarged view on major portions of FIG. 2.

FIGS. 1 through 3 are schematic plan views for illustrating the overall construction of a friction welding machine into which the deflashing apparatus is incorporated. In particular, FIG. 1 illustrates how the friction welding machine is arranged to contact a first workpiece with a second workpiece; FIG. 2 illustrates how the friction welding machine is arranged immediately before a deflashing operation; and FIG. 3 illustrates how the friction welding machine is arranged after the deflashing operation. FIG. 4 illustrates a schematic front view how the friction welding machine is arranged immediately before the deflashing operation. FIG. 5 is an enlarged view on major portions of FIG. 2.

In the drawings, a head stock 2 and a carriage 3 are disposed on a base (or bed) 1 of the friction welding machine. The head stock 2 includes a rotary chuck 21 holding a first workpiece $W_1$, and a main shaft (not shown) assembled therein and being capable of quickly stopping. The carriage 3 includes a hydraulic collet chuck 33 which holds a second workpiece $W_2$ so as to be concentric with an axis of the first workpiece $W_1$. The carriage 3 can advance and retract in the direction of the concentrically-disposed axis by a slider cylinder 12 (i.e., the thrust force applying means). The slider cylinder 12 is attached to a bracket 11. The carriage 3 further includes a main member 31, and an auxiliary member 32. The main member 31 is positioned on the front side (or on the left-hand side in the drawings). The auxiliary member 32 is positioned on the rear side (or on the right-hand side in the drawings), and is connected with the main member 31 but spaced away therefrom. The auxiliary member 32 is connected with the leading end of a rod 121 which extends from the slider cylinder 12. The main member 31 and auxiliary member 32 are guided by rails 13, 13 so that they can advance and retract.

As illustrated in FIG. 5, the hydraulic collet chuck 33 is installed to the main member 31, and includes a piston 331, a hollow piston rod 333 and a working sleeve 335. The piston 331 is fitted into a cylinder chamber 332. The cylinder chamber 332 is formed on the rear of the main member 31 cooperatively with a lid member 34. The hollow piston rod 333 extends forward from the piston 331, and engages and disengages with the working sleeve 335 of the collet chuck 33 by way of an intermediate fitting 334. Whilst, a pair of cutter arms 35, 35 are installed to the main member 31. The cutter arms 35, 35 include press-cutters 351, 351. The press-cutters 351, 351 are disposed at the leading ends of the cutter arms 35, 35. Thus, the press-cutters 351, 351 can be divided into two members, and can envelop the first workpiece $W_1$, one of the joined first and second workpieces $W_1$ and $W_2$. The cutter arms 35, 35 can swivel back and forth about swivel shafts 352, 352 in a horizontal plane which involves the concentrically-disposed axes of the first and second workpieces $W_1$ and $W_2$. As illustrated in FIG. 4, the swivel shafts 352, 352 are connected with an output shaft 361 of a rotary driving source 36. The rotary driving source 36 can be a synchronizing servomotor, for example.

In the drawings, an assistant member is designated at 40. As illustrated in FIG. 5, the assistant member 40 is provided with a bottomed hole 41 in the front surface. The bottomed hole 41 holds the trailing end of a stopper 42 therein. The stopper 42 is fitted idly into the hollow of the piston rod 333. The diameter of the stopper 42 is reduced slightly at the leading end 421. The leading end 421 is further extended into a recess formed in a spring collet 336. The trailing end of the workpiece $W_2$ contacts with the bottom surface of a bottomed hole 422 which is formed in the leading end 421 of the stopper 42. As illustrated in FIGS. 1 through 3, the assistant member 40 is held slidably by two connecting rods 50, 50 which span between the main member 31 and auxiliary member 32. On the rear surface of the assistant member 40, two legs (or pin-shaped members) 51, 51 are connected. The two legs 51, 51 are extended through the auxiliary member 32. The leading ends of the legs 51, 51 can be brought into contact with bumper fittings 52, 52 which are disposed on the front surface of the bracket 11. Thus, as illustrated in FIGS. 2 through 4, the assistant member 40 is designed to stop ahead of the retract end of the carriage 3 by a stroke of press-cutting. Moreover, springs designated at 53 urge the assistant member 40 so that the heads 511, 511 of the legs 51, 51, which are connected with the assistant member 40, always contact with the auxiliary member 32. Bearings designated at 54 are fitted around the connecting rods 50, 50. Bearings designated at 55 are fitted around the legs 51, 51.

The deflashing apparatus of the Preferred Embodiment according to the present invention is constructed as described above. The operations of the deflashing apparatus will be hereinafter described in detail.

The first and second workpieces $W_1$ and $W_2$ are charged by a loader, respectively, to the rotary chuck 21 and the collet chuck 33. The rotary chuck 21 holds the first workpiece $W_1$, and the collet chuck 33 holds the second workpiece $W_2$. Then, the main shaft is actuated to rotate the rotary chuck 21, and the slider cylinder 12 is extended to advance the carriage 3 together with the collet chuck 33. Thus, as illustrated in FIG. 1, the first and second workpieces $W_1$ and $W_2$ are contacted with each other frictionally. Consequently, the contacted portions of the first and second workpieces $W_1$ and $W_2$ are heated by a predetermined frictional thrust force, and are thereafter subjected to a predetermined upset thrust force simultaneously with the abrupt stoppage of the rotation. The pressure welding of the first and second workpieces $W_1$ and $W_2$ is thus completed. However, as best shown in FIG. 5, there arise the thermally influenced portions, for example, ring-shaped flashes "F", at the joint. Then, the rotary chuck 21 is loosened to release the first works piece $W_1$ from the holding. Accordingly, the joined workpiece held by the collet chuck 33 starts retracting together with the carriage 3 in accordance with the contraction of the slider cylinder 12. Note that, in this process, the assistant member 40 is held unmovably between the main member 31 and auxiliary member 32 naturally. In other words, the assistant member 40 moves as one of the constituent elements of the carriage 3 cooperatively with the other constituent elements.

The deflashing operation, one of the features of the deflashing apparatus of the Preferred Embodiment according to the present invention, is carried out by utilizing the retracting process of the carriage 3 effectively. Specifically, when the carriage 3 retracts to a predetermined position, the rotary driving source 36 begins to actuate. Consequently, the pair of cutter arms 35, 35, which have been in the standby state (or the opened state), swivel about the swivel shafts 352, 352 to close. Accordingly, as illustrated in FIG. 2, the edges of the press-cutters 351, 351 envelop the first workpiece $W_1$, and simultaneously therewith the collet chuck 33 is loosened to release the second workpiece $W_2$ (or the joined workpiece) completely. Under the circumstance, the retracting carriage 3 approaches the stopping position (or the retract end), but the leading ends of the legs 51, 51, which extend from the rear surface of the assistant member 40, are brought into contact with the bumper fittings 52, 52 to inhibit the assistant member 40 from retracting. Accordingly, the stopper 42 is stopped and pressed against the trailing end of the joined workpiece, because the stopper 42 is held by the assistant member 40. Thus, not only the assistant member 40 and the stopper 42, but also the joined workpiece are stopped ahead of the retract end of the carriage 3 by a stroke of press-cutting.

At this moment, there arises the relative movement between the continuously retracting carriage 3 (especially the press-cutters 351, 351) and the joined workpiece. The relative movement accompanies the contraction of the springs 53, 53. Note that the contraction of the springs 53, 53 is effected by the main member 31 of the carriage 3 which is retracted relatively with respect to the assistant member 40 by the stroke of press-cutting. Therefore, as illustrated in FIG. 3, the stationary flashes "F" at the joint are removed by shearing with the edges of the retracting press-cutters 351, 351, and the carriage 3 arrives at the stopping position substantially synchronously with the deflashing operation. Finally, the cutter arms 35, 35 are swiveled back to the original standby position, and thereafter the joined workpiece is taken out by an unloader in the same manner as an ordinary pressure welding cycle.

The deflashing apparatus of the Preferred Embodiment has been described with reference to the arrangement in which the rotary driving source 36, such as a servomotor, is employed to swivel the cutter arms 35, 35. The present invention is not limited to this arrangement at all. For instance, it is naturally possible to employ an opening-and-closing shifter in which a linear cylinder and a mechanical transmission mechanism are combined.

Having now fully described the present invention, it will be apparent to one of ordinary skill in the art that many changes and modifications can be made thereto without departing from the spirit or scope of the present invention as set forth herein including the appended claims.

What is claimed is:

1. A deflashing apparatus for a friction welding machine, the friction welding machine including:
   a base;
   a head stock disposed on the base, having a rotary chuck for holding a first workpiece, and a main shaft assembled therein, the main shaft being capable of quickly stopping; and
   a carriage disposed on the base, having a fixed chuck for holding a second workpiece so as to be concentric with an axis of the first workpiece, and being capable of advancing and retracting in the direction of the axis by thrust force applying means;

the deflashing apparatus comprising:
   a pair of cutter arms disposed on the carriage of said friction welding machine, having a leading end, being capable of swiveling, and including a press-cutter, the press-cutter joined at the leading end, being dividable into two members and being capable of enveloping the first workpiece;
   an assistant member disposed on the carriage of said friction welding machine, and holding a stopper, the stopper contacting with an end of the second workpiece; and a bumper fitting disposed on the base of said friction welding machine, and being brought into contact with the assistant member to inhibit the assistant member from retracting;

whereby the assistant member is stopped ahead of a retract end of the carriage by a stroke of press-cutting when the fixed chuck is deactivated to release the second workpiece from the chucking and the assistant member and bumper fitting are brought into contact with each other, and thereafter the carriage with the pair of cutter arms disposed thereon is retracted relatively with respect to the assistant member by the stroke of press-cutting to deflash the joint between the first and second workpieces with the press-cutter.

2. The deflashing apparatus according to claim 1, wherein:

said carriage includes a main member provided with the fixed chuck and cutter arms, and an auxiliary member connected with the main member but spaced away therefrom in the axial direction; and said assistant member is disposed between the main member and auxiliary member, is held movably in the axial direction, and always contracts with the auxiliary member by urging means.

3. The deflashing apparatus according to claim 2, wherein:

said assistant member further has a leg, the leg having a leading end and extending through said auxiliary member, and a retract end of said assistant member is regulated by bringing the leading end of the leg into contact with said bumper fitting.

4. The deflashing apparatus according to claim 1, wherein:

said pair of cutter arms are actuated by a synchronizing servomotor.

5. The deflashing apparatus according to claim 2, wherein:

said carriage further includes a connecting rod, the connecting rod spanning between said main member and auxiliary member; and said assistant member is fitted on the connecting rod relatively movably in the axial direction with respect to said main member and auxiliary member.

6. The deflashing apparatus according to claim 5, wherein:

said urging means is a spring; and the spring is fitted around said connecting rod, urges said assistant member so as to always contact said assistant member with said auxiliary member, and contracts to allow said main member with the cutter arms provided to relatively retract with respect to said assistant member after said assistant member is stopped ahead of the retract end of said carriage by the stroke of press-cutting.

* * * * *

UNITED STATES PATENT AND TRADEMARK OFFICE
CERTIFICATE OF CORRECTION

PATENT NO. : 6,068,038
DATED : May 30, 2000
INVENTOR(S) : Koichi KAWAURA

It is certified that error appears in the above-identified patent and that said Letters Patent is hereby corrected as shown below:

Column 6, line 16, after "retracting" change "carnage" to --carriage--;

Column 7, line 24, after "always" change "contracts" to --contacts--.

Signed and Sealed this

Seventeenth Day of April, 2001

Attest:

NICHOLAS P. GODICI

Attesting Officer     Acting Director of the United States Patent and Trademark Office